United States Patent [19]

Netto Da Costa

[11] Patent Number: 5,218,762

[45] Date of Patent: Jun. 15, 1993

[54] PROCESS TO MANUFACTURE A CYLINDER FOR A ROTARY HERMETIC COMPRESSOR

[75] Inventor: Caio M. F. Netto Da Costa, Joinville, Brazil

[73] Assignee: Empresa Brasileira de Compressores S/A -Embraco, Joinville, Brazil

[21] Appl. No.: 948,284

[22] Filed: Sep. 21, 1992

[30] Foreign Application Priority Data

Sep. 19, 1991 [BR] Brazil .............................. PI9104077

[51] Int. Cl.$^5$ ............................................. B23P 15/04
[52] U.S. Cl. .................................. 29/888.02; 29/414; 29/888.025
[58] Field of Search ...................... 29/888.02, 888.025, 29/414, 415, 416; 225/2

[56] References Cited

U.S. PATENT DOCUMENTS

| | | | |
|---|---|---|---|
| 2,405,904 | 8/1946 | Rataiczak | 29/888.02 |
| 2,650,418 | 9/1953 | Mathery et al. | 29/414 |
| 3,659,764 | 5/1972 | Janiszewski | 225/2 |
| 4,305,192 | 12/1981 | Becker | 29/888.02 |
| 4,406,590 | 9/1983 | Kessler | 29/888.02 |
| 4,496,297 | 1/1985 | Ogawa | 29/888.025 |
| 4,605,362 | 8/1986 | Sturgeon et al. | 29/888.025 |
| 4,629,403 | 12/1986 | Wood | 29/888.025 |
| 4,790,733 | 12/1988 | Vaccara | 29/888.025 |
| 4,802,269 | 2/1989 | Mukai et al. | 225/2 |
| 5,063,661 | 11/1991 | Lindsay | 29/888.02 |

Primary Examiner—Irene Cuda
Attorney, Agent, or Firm—Darby & Darby

[57] ABSTRACT

A process to manufacture a cylinder for a rotary hermetic compressor having a rolling piston, of the type presenting a substantially cylindrical tubular body (20) which defines a pair of opposite end faces (21,22) that are parallel to each other; an internal cylindrical wall (23); and an external wall (24) which is spaced away from said internal cylindrical wall (23), said cylinder further presenting a radial vane slot (10) which is provided from said internal cylindrical wall (23), includes the steps of:

a) shaping in a unique blank piece a substantially cylindrical tubular body (20);

b) providing tension concentration zones in the cylindrical tubular body (20), so as to define a weakening line according to a partitioning diametral plane which passes through the cylinder part that is going to receive the vane slot (10).

c) submitting said cylinder to separating forces which cause tension concentrations in opposite directions to each other, from the weakening line, and which are sufficient to bi-partition the tubular body (20) along said partitioning diametral plane;

d) machining half of the vane slot (10) in each portion of the bi-partitioned tubular body (20); and e) joining both portions of the bi-partitioned tubular body (20).

7 Claims, 1 Drawing Sheet

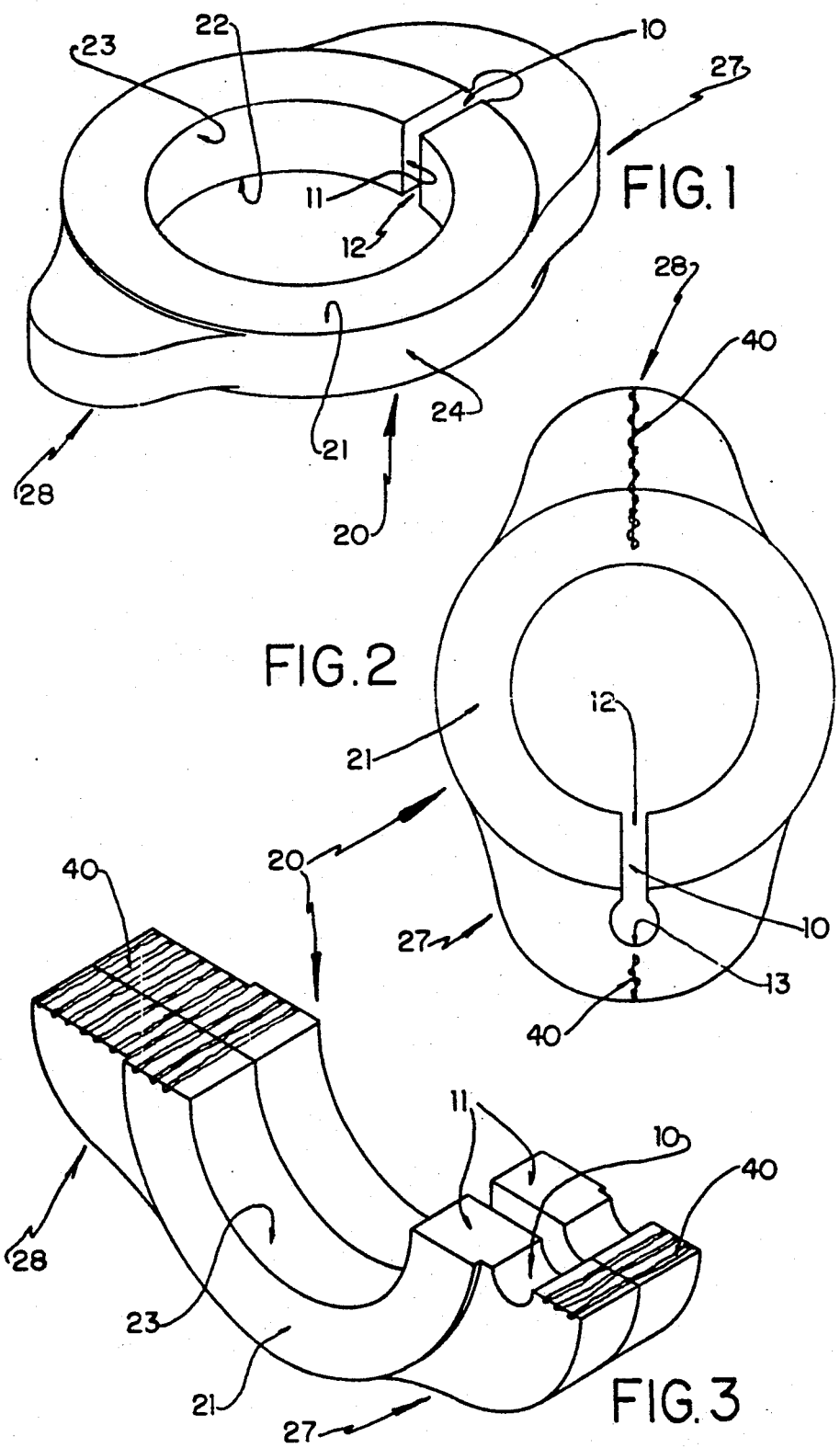

PROCESS TO MANUFACTURE A CYLINDER FOR A ROTARY HERMETIC COMPRESSOR

The present invention refers to a cylinder manufacture process for rotary hermetic compressors having a rolling piston, which facilitates and simplifies the machining and rectifying of the vane slot of said cylinder, without imparing its integrity.

The known cylinder manufacture processes for rotary hermetic compressors having a rolling piston are specially troublesome concerning the machining and rectifying of the vane slot, due to the difficulty in carrying out such processes, considering the required small tolerance.

The manufacture of the vane slot in a cylinder as mentioned above is achieved through a machining process, in which the tubular piece is submitted, in the region of the cylinder where the vane slot will be defined, to a toothed bar which tears the material of the cylinder body, until the configuration of the vane slot in the piece is completed, within the tolerance patterns required for said piece finishing. Besides the operational difficulty, due to the large dimensions of the toothed machine in relation to the cylinder, such process requires frequent stops during the manufacture, so that said toothed machine can be sharpened.

Another process to obtain a vane slot involves the previous cut of the cylinder, in order to create in the region where the vane slot is to be produced, a diametral bi-partition of said cylinder.

In this case, although the machinery is of easy access to the cylinder part to be machined, there is a great posterior difficulty in achieving a perfect coupling of the opposite faces which were cut from the bi-partitioned portions of the cylinder, in order to guarantee the circularity of the cylinder internal face along its length, the cilindricity of the internal wall of the cylinder body and the parallelism between the opposite end faces, due to the high degree of precision that is required, since any cut in the piece involves the removal and consequent loss of material of the cylinder body.

Thus, it is an object of the present invention to provide a cylinder manufacture process for rotary rolling piston hermetic compressors, which is of easy, quick and practical execution and which produces a perfect finishing in the cylinder shape and in the vane slot, with a minimum loss.

Another object of the present invention is to provide a process such as cited above, which can produce mutual seating surfaces that are perfectly fittable to each other, with no need of machining and guaranteeing the hermeticity requirements for the cylinder.

A third object of the present invention is to provide a cylinder manufacture process for rotary rolling piston hermetic compressors, which allows the continuous production of the above cited cylinders, avoiding the frequent stops for maintenance of the equipments involved.

These objects are attained through a substantially cylindrical tubular body which defines a pair of opposite end faces which are parallel to each other; an internal cylindrical wall having a generatrix that is perpendicular to said opposite end faces; and an external wall which is spaced away from said internal wall. The cylinder further presents a radial vane slot which is provided from said internal wall and which has opposite lateral walls. The process of the present invention comprises the steps of:

a) Shaping in a unique blank piece a substantially cylindrical tubular body;

d) Providing tension concentration zones in the cylindrical tubular body, so as to define a weakening line according to a partitioning diametral plane which passes through the cylinder part that is going to receive the vane slot, said weakening line being defined in order to keep the cylindricity and the hermeticity throughout the whole extension of the internal cylindrical wall between the opposite end faces of the cylinder, at least at the cylinder partitioning region that is diametrically opposite to the part of said cylinder which is going to receive the vane slot;

c) Submitting said cylinder to separating forces which cause tension concentrations in opposite directions to each other, from the weakening line, and which are sufficient to bi-partition the tubular body along said partitioning diametral plane;

d) Machining half of the vane slot in each portion of the bi-partitioned tubular body; and e) Joining both portions of the bi-partitioned tubular body, in order to recompose the cylindricity of the internal wall, the parallelism of the opposite end faces and the coplanarity of the parts of each end face, and shaping the vane slot to its final dimensions.

The invention will be described now, with reference to the attached drawings, in which:

FIG. 1 shows a perspective view of a cylinder for a rotary rolling piston hermetic compressor, which is made up in a unique body and which is already provided with a vane slot;

FIG. 2 shows the same cylinder of FIG. 1, pointing out the weakening line which has been provided to bi-partition said cylinder; and FIG. 3 shows, in a perspective view, both portions of the bi-partitioned tubular body with the respective portions of the vane slot.

According to FIG. 1, there is presented a cylinder for a rotary rolling piston hermetic compressor in its already machined final form, which is provided with a sliding vane radial slot 10, which has been obtained by machining an end part of said cylinder in one single piece.

Said cylinder is shown as a massive tubular body 20, which is substantially cylindrical and provided with a pair of end faces 21, 22 which are parallel and opposite to each other; an internal cylindrical wall 23, with its generatrix being perpendicular to said end faces 21, 22; and an end wall 24.

For a perfect sealing finishing of the cylinder, the internal cylindrical wall 23 is perfectly smooth and circular throughout its extension between the opposite end faces 21, 22 of the cylinder body 20.

The vane slot 10 is defined by a pair of lateral walls 11, having one open end 12, which is opened to the internal cylindrical wall 23 of the tubular body 20, and an opposite end 13 that is internal to said tubular body 20, said opposite end 13 ending in a circular region which is designed to house a spring that biases one of the ends of a sliding vane (not shown). Said vane slot 10 extends along the whole length of the tubular body 20.

According to the present invention, said vane slot 10 is obtained by submitting the above cited cylinder to an initial bi-partition, i.e., by cutting said cylinder according to a partitioning diametral plane comprising a weakening line that is defined by the provision of tension concentration zones in the tubular body 20, which cause the division thereof when the cylinder is submitted to separating forces. Said tensions act in opposite directions to each other, from the weakening line. When the partitioning diametral plane is orthogonal to the opposite end faces 21, 22, said tensions are orthogonal in relation to said partitioning diametral plane and parallel to said end faces 21, 22, submitting the tubular body 20 to a median bi-partition in relation to the walls 11 of the vane slot 10.

The cylinder weakening line is obtained by providing the opposite end faces 21, 22 of opposite end projections 27 and 28 of the tubular body 20, with a series of superficial grooves 40, which may or may not be aligned to each other, as will be discussed later. Said superficial grooves 40 can also be provided on the external wall 24 of the tubular body 20, aligned with the superficial grooves 40 of said opposite end faces 21, 22. In the end projection 27 of said tubular body 20, such grooves can also be defined in the cylindrical internal wall 23 of the tubular body 20, where the vane slot 10 will be machined.

The internal cylindrical wall 23 of the tubular body 20 does not receive grooves in the opposite end projection 28, so as not to impair the cylindricity and the hermeticity of said internal cylindrical wall 23 and, consequently, the operation of the cylinder. Another possible form to obtain the weakening line in the tubular body 20 is during its casting, when there are defined, through the inside of its massive tubular body 20, blind channels or through channels, or air holes, which are aligned according to one direction of the partitioning diametral plane. The channels can be of the through type only when they are provided perpendicularly in relation to the opposite end faces 21, 22. In any one of the possible embodiments, the superficial openings should not affect the cilindricity of the internal cylindrical wall 23 of the tubular body 20, avoiding a possible compression loss in the cylinder. Such openings can also be defined near the weakening line, but not necessarily coincident with the same, assuming a random positioning, defining a non-straight rupture line which permits a better posterior coupling of both portions of the bi-partitioned tubular body 20 and a more efficient hermeticity, due to the labyrinth rupture condition which was created.

The bi-partition is obtained by submitting the tubular body 20 to separating forces which will act upon the previously created openings, relatively spacing away each portion from said bi-partitioned tubular body 20. When the separating forces are expanding forces that are applied on the center of the cylinder body 20, with neither portion of the bi-partitioned tubular body 20 being retained to a fixed structure, the spacing between said portions of the tubular body 20 is mutual and opposite, in a direction that is perpendicular to the partitioning diametral plane.

When the separating forces are of the traction or bending types, the application thereof can occur according to respectively substantially orthogonal directions in relation to the partitioning plane and to substantially parallel directions in relation to said partitioning diametral plane.

The bi-partition of the tubular body 20 creates, in the partition region, "codified" corrugated surfaces presenting one single possible way for recomposing the original form of the tubular body 20, through the perfect mating with the corrugated surface which has adjacently been created during the bi-partition of said tubular body 20, avoiding the necessity of machining and rectifying of said bi-partitioned tubular body 20, in order to guarantee, at the later recomposition thereof, the cylinder hermeticity. Furthermore, such procedure maintains the parallelism between the opposite end faces 21, 22 and the coplanarity of the bi-partitioned portions of each respective opposite end face 21, 22.

After the tubular body 20 is bi-partitioned, the vane slot 10 is made through an adequate process, producing two symmetrical halves, when the partitioning plane is median in relation to the tubular body 20, said halves being joined afterwards, when the original form of the tubular body 20 is recomposed.

I claim:

1. Process to manufacture a cylinder for a rotary hermetic compressor having a rolling piston, of the type presenting a substantially cylindrical tubular body (20) which defines a pair of opposite end faces (21,22) that are parallel to each other; an internal cylindrical wall (23) having a generatrix that is perpendicular to said opposite end faces (21,22); and an external wall (24) which is spaced away from said internal cylindrical wall (23), said cylinder further presenting a radial vane slot (10) which is provided from said internal cylindrical wall (23), said process comprising the steps of:

a) shaping in a unique blank piece a substantially cylindrical tubular body (20);

b) providing tension concentration zones in the cylindrical tubular body (20), so as to define a weakening line according to a partitioning diametral plane which passes through the cylinder part that is going to receive the vane slot (10), said weakening line being defined in order to keep the cylindricity and the hermeticity throughout the whole extension of the internal cylindrical wall (23) between the opposite end faces (21,22) of the tubular body (20), at least at the region of the latter that is diametrically opposed to the part of said tubular body (20) which is going to receive the vane slot (10);

c) submitting said cylinder to separating forces which cause tension concentrations in opposite directions to each other, from the weakening line, and which are sufficient to bi-partition the tubular body (20) along said partitioning diametral plane;

d) machining half of the vane slot (10) in each portion of the bi-partitioned tubular body (20); and e) joining both portions of the bi-partitioned tubular body (20), in order to recompose the cylindricity of the internal cylindrical wall (23), the parallelism of the opposite end faces (21,22) and the coplanarity of the parts of each end face (21,22), and shaping the vane slot (10) to its final dimensions.

2. Process, as in claim 1, wherein the steps "a" and "b" occur simultaneously.

3. Process, as in claim 2, wherein the separating forces are applied in directions which are perpendicular to the partitioning diametral plane containing the weakening line.

4. Process, as in claim 3, wherein the separating forces are applied to both portions of the bi-partitioned tubular body (20), according to directions which are opposite to each other.

5. Process, as in claim 1, wherein the partitioning diametral plane is symmetrical in relation to the lateral walls (11) of the vane slot (10).

6. Process, as in claim 1, wherein the separating forces cause the symmetrical diametral rupture of the tubular body (20).

7. Process, as in claim 1, wherein the tension concentrations occur orthogonally in relation to the partitioning diametral plane containing the weakening line.

* * * * *